Patented Feb. 29, 1944

2,342,870

UNITED STATES PATENT OFFICE 2,342,870

RUBBER VULCANIZATION ACCELERATOR

Albert J. Laliberte, Naugatuck, Conn., assignor to United States Rubber Company, New York, N. Y., a corporation of New Jersey No Drawing. Application March 27, 1940, Serial No. 326,175

2 Claims. (Cl. 260—793)

This invention relates to new compounds, and particularly to a new and useful composition of matter particularly suitable as a vulcanization accelerator. The products are dibutyldithiocarbamate reaction products of phosgene.

The following example is given to illustrate the invention:

Example 1

The product is prepared by reacting under carefully controlled conditions, an aqueous solution of sodium dibutyl dithiocarbamate with phosgene. The process of manufacture is described as follows:

Into a suitable 500-gallon, stainless steel, agitated and jacketed reactor, equipped with an adequate ventilating and adsorbing system for noxious gases, are added 1,375 pounds of water, and 95 pounds of flake (95%) sodium hydroxide. The mixture is agitated until solution of the flake caustic is complete. Two hundred and eighty-seven pounds of dibutylamine are then added, and the mixture stirred until dispersion is complete. Cooling water is then turned on the jacket, and 171 pounds of carbon disulphide are added over a two hour period, keeping the temperature of the reaction mixture below 35° C., and preferably between 25° C. and 35° C. When the carbon disulphide has all been added, the batch is stirred for one hour and the temperature lowered to approximately 25° C.

To the cooled solution of sodium dibutyl dithiocarbamate which is formed as prepared above, are added 1,750 pounds of water and the mixture is stirred until homogeneous. One hundred and thirty-five pounds of phosgene gas are then introduced into the solution from a steam heated cylinder, through a suitable distributor, which consists of a stainless steel tube, perforated with $\frac{1}{16}$ inch holes. The initial rate of phosgene addition is approximately 40-50 pounds per hour, which rate is lowered to approximately 2-3 pounds per hour at the end of the reaction.

During the phosgene treatment, cooling water is kept on the jacket of the reactor, and the final temperature should not exceed 35° C. Completion of the reaction is indicated by testing the solution with litmus paper. If an acid test is obtained, the reaction is considered complete. At this stage of the reaction, the light yellow, oily reaction product which separates out, and floats on top consists mainly of carbonyl di-(symmetrical dibutyl dithiocarbamate).

Steam is then carefully applied to the jacket of the reaction vessel, and the batch is slowly warmed. At 40° C., evolution of carbonyl sulphide, (COS) takes place vigorously, and at 50° C., decomposition into tetra butyl thiuram monosulphide, and accompanying by-products is complete. The batch is allowed to stand with agitation at this temperature for one hour, is then cooled, and allowed to settle.

The wet, oily layer of the reaction product contains approximately 80% of tetra butyl thiurammonosulphide, approximately 15% of tetra butyl urea, and approximately 5% of tetra butyl thiourea. These proportions may be varied while still retaining such components in the mix. This product is then drawn off, and washed with water. Final separation and drying is accomplished by means of a centrifuge.

The reaction product consists substantially of tetra butyl thiuram monosulphide, and shows the following analysis:

| | Per cent |
|---|---|
| Total nitrogen | 7.6 |
| Sulphur | 19.38 |

Instead of sodium hydroxide, other alkali may be used to form a water soluble salt of N-dibutyl dithiocarbamic acid to be reacted with the phosgene, the salt portion being eliminated as the chloride.

While the above reactions can be carried out in ordinary iron equipment, it is best to use acid resistant material, such as glass, enameled steel, stainless-steel or Monel, in order to prevent discoloration of the end product due to the contamination with heavy metals.

Whereas the material may be purified to remove the ingredients associated with the tetrabutyl thiurammonosulphide, which constitutes a preponderant amount of the final product, it has been found that the unpurified material especially where used as a vulcanization accelerator is a better vulcanization accelerator than the straight monosulphide. The composite mixture presents definite advantages over the use of the straight monosulphide, and over related reaction products derived from secondary aliphatic amines, in that much greater freedom from scorch is obtained, the vulcanizate is substantially free from stain in the case of white compounds, and has less odor than the related compounds.

The mixture combines the properties of very short curing time at normal vulcanization temperatures, with a maximum of safety from precuring in manufacturing operations.

When used as an accelerator it may be applied to the vulcanization of various vulcanizable rubbers, natural and artificially prepared, whether such rubbers are in the solid form or in the form of an aqueous dispersion and whether compounded or not with suitable fillers, anti-oxidants, etc.

Having thus described my invention, what I claim and desire to protect by Letters Patent is:

1. A rubber vulcanization accelerator comprising a mixture of a tetra butyl thiuram monosulphide, a tetra butyl thiourea, and a tetra butyl urea, in which the monosulphide constitutes a predominant and major proportion of the mix and the thiourea and urea together constitute a minor proportion of the mix.

2. A rubber vulcanization accelerator comprising tetra butyl thiuram monosulphide, tetra butyl thiourea, and tetra butyl urea, in which the monosulphide constitutes a predominant and major proportion of the mix and the thiourea and urea together constitute a minor proportion of the mix.

ALBERT J. LALIBERTE.